(12) United States Patent
Chelvayohan

(10) Patent No.: US 6,590,223 B1
(45) Date of Patent: Jul. 8, 2003

(54) APPARATUS AND METHOD FOR MEDIA PRESENCE DETECTION

(75) Inventor: Mahesan Chelvayohan, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 83 days.

(21) Appl. No.: 09/898,324

(22) Filed: Jul. 3, 2001

(51) Int. Cl.[7] ............................ G01N 21/86; G01V 8/00
(52) U.S. Cl. .................... 250/559.4; 356/446; 356/448; 347/16
(58) Field of Search .................. 250/559.4, 559.11, 250/559.15, 559.16, 559.17, 559.18, 559.28; 356/446, 445, 433, 432, 448, 239.1, 601, 612; 349/16, 19; 271/258.01, 3.13

(56) References Cited

U.S. PATENT DOCUMENTS

| | | |
|---|---|---|
| 3,827,808 A | 8/1974 | Cho |
| 4,540,887 A | 9/1985 | Minerd et al. |
| 4,685,982 A | 8/1987 | Kucheck |
| 4,730,932 A | 3/1988 | Iga et al. |
| 4,945,253 A | 7/1990 | Frohardt |
| 5,103,106 A | 4/1992 | Golberstein |
| 5,139,339 A * | 8/1992 | Courtney et al. ............ 356/446 |
| 5,262,637 A | 11/1993 | Cumberledge et al. |
| 5,764,251 A | 6/1998 | Hashimoto |
| 5,844,682 A | 12/1998 | Kiyomoto et al. |
| 5,925,889 A * | 7/1999 | Guillory et al. ....... 250/559.16 |
| 6,006,668 A | 12/1999 | Rehmann |
| 6,018,164 A | 1/2000 | Mullens |

* cited by examiner

Primary Examiner—Kevin Pyo
Assistant Examiner—Seung C Sohn
(74) Attorney, Agent, or Firm—Staas & Halsey, LLP

(57) ABSTRACT

Media manipulation and sensing apparatuses including a media detector and method for media detection, wherein a light source and/or light sensor of a media detector is blocked using a light blocking mechanism, such that the detected light intensity of the light sensor is effectively zero. The media detector having such a media blocking mechanism may also be used for media type detection.

21 Claims, 3 Drawing Sheets

APPARATUS AND METHOD FOR MEDIA PRESENCE DETECTION

BACKGROUND OF THE INVENTION

1. Field of the Invention

The present invention relates to a method and apparatus for detecting the presence of media. More particularly, the present invention relates to a method and apparatus for detecting the presence of media based on a detection of light intensity.

2. Description of the Related Art

Media manipulation and sensing apparatuses typically include a media detector for detecting for the presence of media. The media manipulation and sensing apparatuses typically include media trays, picking mechanisms to move the media from the media trays, and mechanisms thereafter to perform some manipulation or sensing of the media. A media detector may be positioned near the picking mechanism and detect the presence of the media by the picking and feeding of the media past the media detector, such that upon the initiating of a picking and feeding operation the media detector would be able to detect whether a media is present.

However, it would be advantageous to know whether media is present prior to the initiating of the printing and feeding operation or while another media is being printed upon or fed.

Typically, the presence of media in a media manipulation or sensing apparatus is detected by mechanical media detectors, as illustrated by Kikuchi et al., U.S. Pat. No. 4,690,577, where a media entering a printing area moves a mechanical lever and the movement of the lever is detected, or through optical media detectors, as illustrated by Minerd et al., U.S. Pat. No. 4,540,887, where a reflective or translucent property of a media is used to detect the media's presence. Similar optical media detection has also been disclosed in Courtney et al., U.S. Pat. No. 5,139,339, in which the media detector also detects the media type.

Previously, the sensing of media presence by a media detector was accomplished by several different techniques. Some techniques included having a highly reflective material in the media path, such that light illuminating the media path at a precise angle would be highly reflected to the specularly arranged sensor when media was not present. However, with the current use of highly reflective transparency media, this technique would not work as the specularly arranged sensor may indicate a lack of media presence when the media present is a transparency.

Alternative techniques included placing a light redirecting surface beneath the media path, such that when media was not present the specularly arranged sensor would only measure a negligible amount of light. An example of this technique would be to have a surface directly beneath the media detector with a surface angle different from the surface angle of a media path. When no media is present, light would be redirected by the differently angled surface, away from the specularly arranged sensor. However, these techniques that use the light redirecting surface are not usually reliable, as light from external sources may infiltrate a light detecting area of the media detector and thus allow enough light to radiate to the specularly arranged sensor to indicate, inaccurately, that media is present. Typically, media detectors are positioned above the media path with spacing therebetween, which undesirably allows for such external light to infiltrate the media detecting area of the media detector.

Further, in a related art, media manipulation or sensing apparatuses may operate in different modes based on the presence of different types of media. A media manipulation or sensing apparatus may operate in a different mode if the media type is of a high glossy type, like a transparency media type, compared to when the media type is of a low glossy type, like plain paper. For example, in a printing environment, certain parameters of printing onto a media are adjusted based upon the media type determination. Typically, in the printing environment, a user must manually indicate to a printing apparatus what type of media is present. Alternatively, some printing systems "pick," or grab, the media and advance it through the printing system, and then determine the type of media, format the parameters for printing thereon, and proceed with printing onto the media. However, these systems are not usually desirable, as the printing system cannot perform the procedure to determine what type of media is being printed on until after advancing the media, which reduces the throughput of media in the printing system. Knowing the media type before picking allows one to adjust certain printing parameters so as to optimize the printing process for that media. This is something that is now done when the user manually indicates to the printing system what type of media is present.

These aforementioned optical methods and apparatuses previously implemented for media detection have also been included in such media type detectors, having multiple sensors detecting an amount of light reflected off a media. In one media type detector, as illustrated in FIG. 1, when light source 10 irradiates media 5, light reflecting off media 5 is detected by diffuse sensor 20 and specular sensor 30. The glossiness of media 5 may be determined by measuring the ratio of the detected diffuse I(D) and specular I(S) light intensities. Glossier papers tend to reflect specularly more than difflusely, thus a media type detecting ratio of I(S)/I(D) can be used to determine the glossiness of media 5, from which the type of media can be determined.

Therefore, the present invention overcomes these aforementioned deficiencies in conventional systems by setting forth a media detector wherein a light blocking mechanism is used in conjunction with a light source and sensor, such that extraneous light will not enter a media detecting area and cause the media detector to generate inaccurate media detection results. In addition, the present invention allows for the placement of the media detector before a picking mechanism, such that it can be determined whether media is present before initiating a picking operation. The present invention can be utilized in combination with a media type detector to detect media type when media is detected.

SUMMARY OF THE INVENTION

An object of the present invention is to provide a method and apparatus for detecting the presence of media based on a detection of light intensity.

An additional object of the present invention is to provide a media manipulation apparatus having a media detector including, a first light sensor arranged on a top or bottom side of a media path, and a light blocking mechanism arranged on an opposing side of the media path compared to the arrangement of the first light sensor. The light blocking mechanism blocks light from being detected by the first light sensor when a media is not present on the media path between the first light sensor and the light blocking mechanism. The media manipulation apparatus also includes a determining unit to determine whether the media is present based on a detected light intensity of the first light sensor being effectively zero. apparatus having a media detector including, a first light sensor arranged on a top or bottom side of a media path, and a light blocking mechanism arranged on an opposing side of the media path compared to the arrangement of the first light sensor. The light blocking mechanism blocks light from being detected by the first light sensor when a media is not present on the media path between the first light sensor and the light blocking mechanism. The media sensing apparatus further includes a determining unit to determine whether the media is present based on a detected light intensity of the first light sensor being effectively zero.

Another object of the present invention is to provide a media detector having a first light sensor arranged on a top or bottom side of a media path, and a light blocking mechanism arranged on an opposing side of the media path compared to the arrangement of the first light sensor. The light blocking mechanism blocks the first light sensor from detecting light when a media is not present on the media path between the first light sensor and the light blocking mechanism.

Another object of the present invention is to provide a media detection method for use with a media detector having a light source and a first light sensor to detect a light intensity of light reflecting off of a media that travels on a media path, with the light source and first light sensor being arranged on a top or bottom side of the media path. The media detection method includes blocking the first light sensor from detecting light by using a light blocking mechanism arranged on an opposing side of the media path, compared to the arrangement of the light source and first light sensor, when no media is present in the media path between the first light sensor and the light blocking mechanism, and determining whether the media is present based on an intensity of the first light sensor being effectively zero.

Another object of the present invention is to provide a media detection method for use with a media detector having a light source and a first light sensor to detect a light intensity of light reflecting off of a media that travels on a media path, with the light source and first light sensor being arranged on a top or bottom side of the media path. The media detection method includes blocking the light source from radiating light onto a media path area by using a light blocking mechanism arranged on an opposing side of the media path, compared to the arrangement of the light source and first light sensor, when no media is present in the media path between the light source and the light blocking mechanism, and determining whether the media is present based on an intensity of the first light sensor being effectively zero.

BRIEF DESCRIPTION OF THE DRAWINGS

Advantages of the invention will become apparent and more readily appreciated for the following description of the preferred embodiments, taken in conjunction with the accompanying drawings of which.

DETAILED DESCRIPTION OF THE PREFERRED EMBODIMENTS

Reference will now be made in detail to the preferred embodiments, examples of which are illustrated in the accompanying drawings. In accordance with the preferred embodiments, there is provided a method and apparatus for providing accurate media presence detection.

Figure 1:
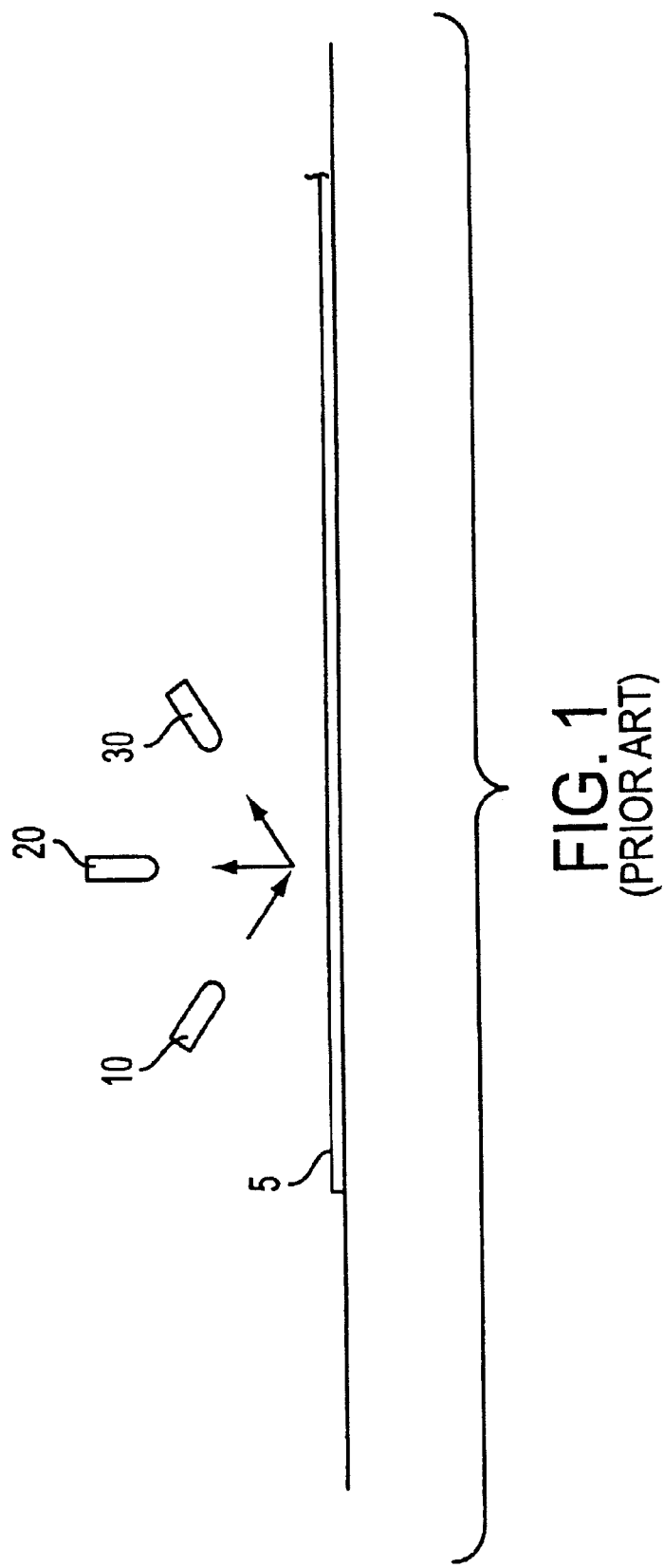
FIG. 1 is an illustration of a media detector having a light source, a diffuse sensor, and a specular sensor.

As mentioned above, FIG. 1 illustrates a media type detector for detecting a type of media. The present invention will be illustrated herein as being a light blocking mechanism embodied with such a media type detector, noting that any media detector could also be included with the light blocking mechanism. The media detector does not have to have multiple sensors and only one light source; there may be multiple light sources, one light sensor, a multitude of sensors, or one light source and one sensor. In addition, the light blocking mechanism of the present invention may be positioned in any number of places throughout a media manipulation or sensing apparatus, wherever the detection of a media presence is needed. Further, the light source and sensor configuration shown in FIG. 1 is not necessary for operation of the present invention, as any configuration would work as long as light radiating from a light source and/or light radiating to a sensor is blocked when media is not present.

Figure 2:
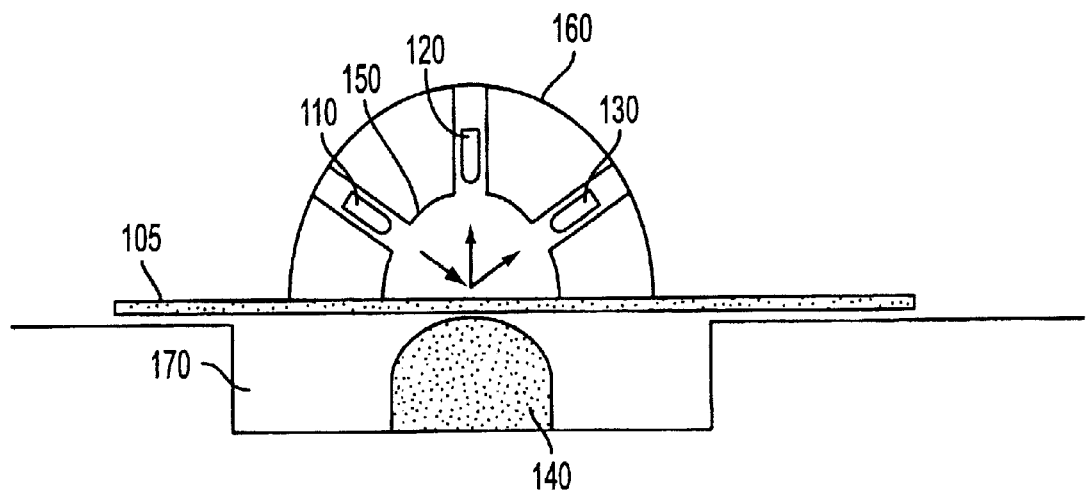
FIG. 2 is an illustration of the operation of the media detector with media bridging a light blocking mechanism.

Thus, FIG. 2 illustrates a media detector having a light source 110, a diffuse sensor 120, a specular sensor 130, and a light detecting area 150. As light source 110 illuminates media 105 passing beneath light detecting area 150, light is reflected off media 105 and detected by diffuse sensor 120 and specular sensor 130. In the configuration set forth in FIG. 2, the media detector may also be used to detect the media type of media 105 passing beneath light detecting area 150. Recess 170 is positioned beneath light detecting area 150, with light blocking mechanism 140 being positioned within recess 170 such that light blocking mechanism 140 will mate, when no media is present, sufficiently with light detecting area 150 to block light from radiating from light source 110 and/or from radiating to diffuse sensor 120 and specular sensor 130.

As illustrated in FIG. 2, light blocking mechanism 140 may be of a bulbous or bump shape and may be conformal to the shape of a light detecting area 150 of the light detector. However, the shape of light blocking mechanism 140 is not necessarily so limited. All that is needed for the shape of light blocking mechanism 140 is that light blocking mechanism 140 sufficiently block light from radiating from light source 110 and/or from radiating to diffuse sensor 120 and specular sensor 130. In addition, although light source 110, diffuse sensor 120 and specular sensor 130 have been illustrated as being in a housing 160, housing 160 is not necessary, as long as blocking mechanism 140 is formed such that light radiating from light source 110 and/or radiating to diffuse sensor 120 and specular sensor 130 is blocked.

Figure 3:
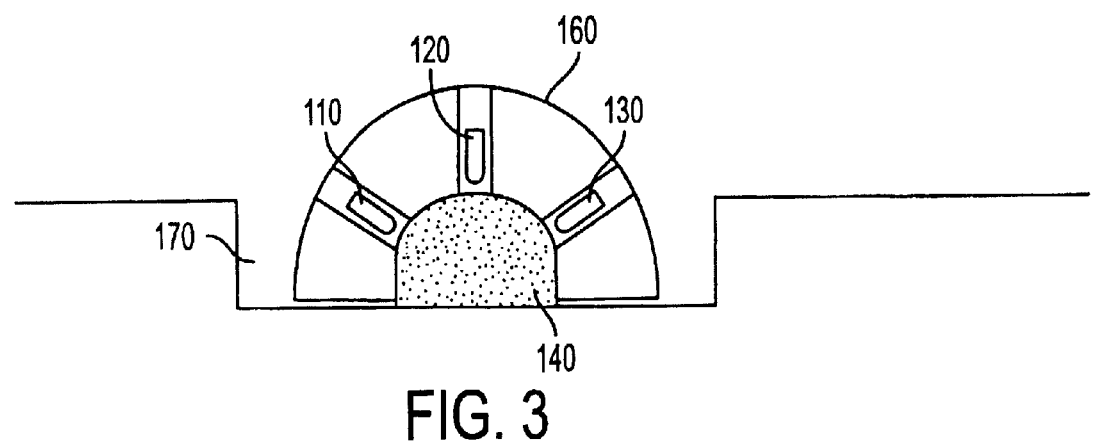
FIG. 3 is an illustration of the operation of the media detector with a media detecting area of the media detector being blocked by the light blocking mechanism.

FIG. 3 illustrates light blocking mechanism 140 mating with a surface of the previously illustrated light detecting area 150 when no media is present. As shown, housing 160, containing light source 110, diffuse sensor 120 and specular sensor 130, enters recess 170 when no media is present, such that light blocking mechanism 140 blocks light from both radiating from light source 110 and radiating to diffuse sensor 120 and specular sensor 130. With light radiating into both diffuse sensor 120 and specular sensor 130 being blocked, it can be accurately determined whether media is present. Alternatively, instead of housing 160 entering recess 170, and thereby mating light blocking mechanism 140 with previously illustrated light detecting area 150, light blocking mechanism 140 could be caused to move into previously illustrated light detecting area 150 when no media is present, and thereby likewise block light from radiating from either extraneous sources or light source 110 to diffuse sensor 120 and specular sensor 130. The movement of housing 160 or light blocking mechanism 140 could be implemented by a spring or force applying unit to cause the mating of light blocking mechanism 140 with previously illustrated light detecting area 150.

Further, in a media manipulation or sensing apparatus, a detection unit could determine from the detected light intensities of both diffuse sensor 120 and specular sensor 130, e.g., both being effectively zero, that no media is present. The effectively zero amount used in such a determination should be an amount of detected light intensity that should not be considered as reflecting off a media. For example, a very diffuse media will have a low detected specular intensity, and any amount below that low intensity should be considered as evidence of no media being present. Similarly, a very reflective media will have a low detected diffuse intensity, and any amount below that low intensity should be considered as evidence of no media being present. In addition, the detection unit, which could be a processor or include hard wiring, could also be utilized to determine the glossiness of any media present, and from the glossiness determine the type of media.

As illustrated in FIGS. 1–3, light source 110, diffuse sensor 120 and specular sensor 130 may be imbedded within cavities of housing 160. The cavities may operate as light tubes that act as apertures guiding light from light source 110 or to diffuse sensor 120 and specular sensor 130. In such a case, it may be advantageous to include projections on light blocking mechanism 140, such that the projections enter the end apertures of the light tubes to seal each light tube. Likewise, if light source 110 and/or diffuse sensor 120 and specular sensor 130 are configured in housing 160 whereby they protrude, from housing 160, into light detecting area 150, then it would be advantageous to include depressions within light blocking mechanism 140, whereby light source 110 and/or diffuse sensor 120 and specular sensor 130 would protrude into light blocking mechanism 140.

Although light detecting area 150 has been set forth herein as being on the top of the media path, with light blocking mechanism 140 being on the opposing side of any media traveling on the media path, the light blocking mechanism 140 could be arranged on top side of the media path with light detecting area 150 being on the opposing side of any media traveling on the media path. In addition, the surface of the light detecting area may be of any shape.

The above disclosed media detector has been described as being able to detect the presence of media. This media detector has a multitude of different applications and may be bodily incorporated into a number of different media manipulating or sensing apparatuses. In addition, as noted above in an embodiment with both diffuse and specular sensors, the presently disclosed media presence detection may be accompanied with a media type detection, using the same diffuse and specular sensors to determine a glossiness of a media present, and thereby determine the type of media present.

Figure 4A:
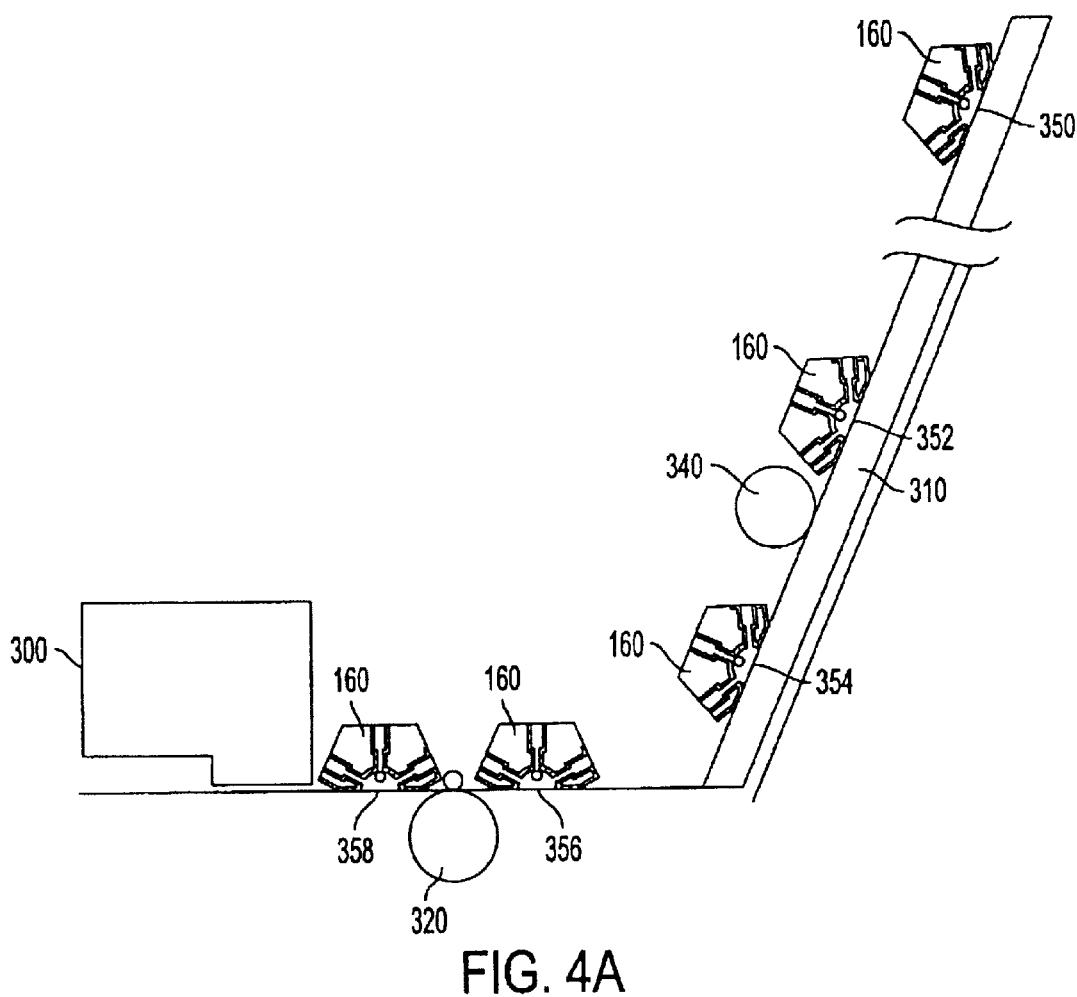
FIGS. 4A and 4B are illustrations showing examples of arrangements of a media detector in, respectively, vertical and horizontal sheet feeder printing environments.
Figure 4B:
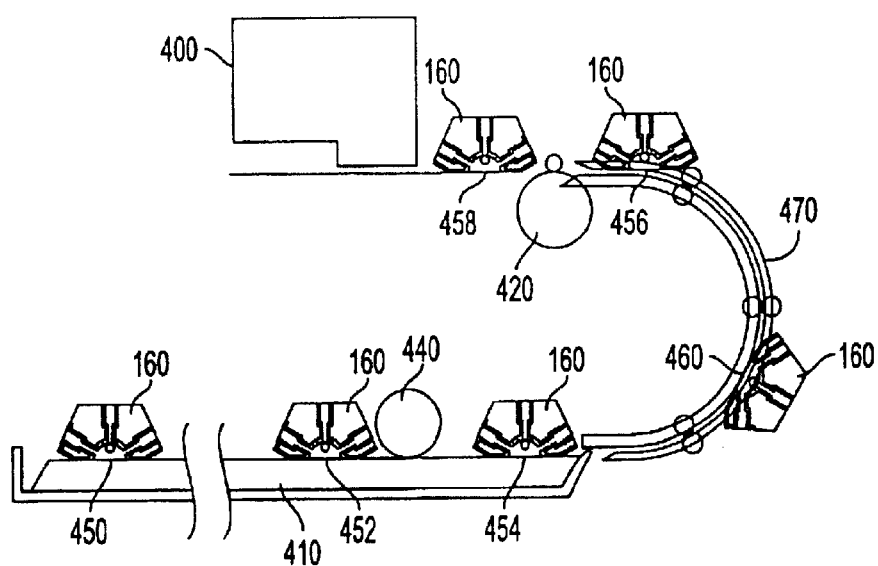

FIGS. 4A and 4B illustrate embodiments where the present invention may be arranged in a printer, for example, in vertical (FIG. 4a) or horizontal (FIG. 4b) sheet feeders, noting that embodiments of the present invention corresponding to other media manipulation and sensing apparatuses could also be configured similarly.

FIG. 4A illustrates multiple arrangements within a printer for housing 160 in a vertical sheet feeder. As illustrated in FIG. 4A, housing 160 can be positioned at the trailing edge 350 of paper stack 310, before picking mechanism 340 on paper stack 310 at position 352, after picking mechanism 340 on paper stack 310 at position 354, before feeding nip 320 at position 356, after feeding nip 320 and before printhead 300 at position 358.

FIG. 4B illustrates multiple arrangements within a printer for housing 160 in a horizontal sheet feeder. As illustrated in FIG. 4B, housing 160 can be positioned at the trailing edge 450 of paper stack 410, before picking mechanism 440 on paper stack 410 at position 452, after picking mechanism 440 on paper stack 410 at position 454, in the paper transport path 470 at position 460, before feeding nip 420 at position 456, after feeding nip 420 and before printhead 400 at position 458. Although these arrangements within a printer have been set forth herein, the present invention should not be limited thereto.

Further, FIGS. 4A and 4B have illustrated a printing example of a media manipulation and the present invention should not be limited thereto. For example, additional media manipulation apparatuses could also include photocopiers, printers, paper handlers, as well as additional apparatuses that move or manipulate media, which have a need to determine the presence of media. Media sensing apparatuses could also include several of the aforementioned apparatuses that manipulate the media as well as perform some type of media sensing, such as photocopiers which scan the media and move the media from place to place, as well as apparatuses that perform sensing without any manipulation, such as flat bed scanners, where the determination of media presence may be of importance, but no manipulation is performed on the media. In the sensing apparatuses, similar to the manipulation apparatuses, it is advantageous to perform the media detecting prior to performing the media manipulation or sensing operations.

Thus, although a few preferred embodiments of the present invention have been shown and described, it would be appreciated by those skilled in the art that changes may be made in these embodiments without departing from the principles and spirit of the invention, the scope of which is defined in the claims and their embodiments.

What is claimed is:

1. A media manipulation apparatus, comprising:
 a media detector including,
  a first light sensor arranged on a top or bottom side of a media path; and
  a light blocking mechanism arranged on an opposing side of the media path compared to the arrangement of the first light sensor, wherein the light blocking mechanism impedes propagation of light from a light source to block light from being detected by the first light sensor when a media is not present on the media path between the first light sensor and the light blocking mechanism; and
  a determining unit to determine whether the media is present based on a detected light intensity of the first light sensor being effectively zero.

2. The media manipulation apparatus of claim 1, further comprising:
 a second light sensor arranged in the media detector to detect specularly reflected light from the media, with the first light sensor being arranged to detect diffusely reflected light from the media; and wherein the determining unit bases the determination of media presence on both first and second light sensors detecting effectively zero light intensity.

3. The media manipulation apparatus of claim 2, wherein the determining unit also determines a type of media present on the media path, when media is present, based on a ratio of detected light intensities of the first and second light sensors.

4. A media manipulation apparatus, comprising:

a media detector including, a first light sensor arranged on a top or bottom side of a media path; and a light blocking mechanism arranged on an opposing side of the media path compared to the arrangement of the first light sensor, wherein the light blocking mechanism blocks light from being detected by the first light sensor when a media is not present on the media path between the first light sensor and the light blocking mechanism; and a determining unit to determine whether the media is present based on a detected light intensity of the first light sensor being effectively zero, wherein the light blocking mechanism is conformal with the shape of a light detecting area of the media detector, and recessed in a cavity beneath the media path, such that when media is not present on the media path between the light detecting area and the light blocking mechanism the light blocking mechanism mates with the light detecting area to block light from being detected by the first light sensor.

5. The media manipulation apparatus of claim 1, wherein the media detector is positioned such that the determination of whether media is present may be made without a picking operation of a picking mechanism being initiated.

6. A media sensing apparatus, comprising:

a media detector including, a first light sensor arranged on a top or bottom side of a media path; and a light blocking mechanism arranged on an opposing side of the media path compared to the arrangement of the first light sensor, wherein the light blocking mechanism impedes the propagation of light from a light source to block light from being detected by the first light sensor when a media is not present on the media path between the first light sensor and the light blocking mechanism; and a determining unit to determine whether the media is present based on a detected light intensity of the first light sensor being effectively zero.

7. The media sensing apparatus of claim 6, further comprising:

a second light sensor arranged in the media detector to detect specularly reflected light from the media, with the first light sensor being arrange to detect diffusely reflected light from the media; and wherein the determining unit bases the determination of media presence on both first and second light sensors detecting effectively zero light intensity.

8. The media sensing apparatus of claim 7, wherein the determining unit also determines a type of media present on the media path, when media is present, based on a ratio of detected light intensities of the first and second light sensors.

9. A media sensing apparatus, comprising:

a media detector including, a first light sensor arranged on a top or bottom side of a media path; and a light blocking mechanism arranged on an opposing side of the media path compared to the arrangement of the first light sensor, wherein the light blocking mechanism blocks light from being detected by the first light sensor when a media is not present on the media path between the first light sensor and the light blocking mechanism; and a determining unit to determine whether the media is present based on a detected light intensity of the first light sensor being effectively zero, wherein the light blocking mechanism is conformal with the shape of a light detecting area of the media detector, and recessed in a cavity beneath the media path, such that when media is not present on the media path between the light detecting area and the light blocking mechanism the light blocking mechanism mates with the light detecting area to block light from being detected by the first light sensor.

10. A media detector, comprising:

a first light sensor arranged on a top or bottom side of a media path; and a light blocking mechanism arranged on an opposing side of the media path compared to the arrangement of the first light sensor, wherein the light blocking mechanism impedes the propagation of light from a light source to block the first light sensor from detecting light when a media is not present on the media path between the first light sensor and the light blocking mechanism.

11. The media detector of claim 10, further comprising:

a second light sensor arranged to detect specularly reflected light from the media, with the first light sensor being arranged to detect diffusely reflected light from the media; and a determining unit to determine whether the media is present based on both first and second light sensors detecting effectively zero light intensity.

12. The media detector of claim 11, wherein the determining unit also determines a media type of the media when the media is present, based on a ratio of detected light intensities of the first and second light sensors.

13. A media detector, comprising:

a first light sensor arranged on a top or bottom side of a media path; and a light blocking mechanism arranged on an opposing side of the media path compared to the arrangement of the first light sensor, wherein the light blocking mechanism blocks the first light sensor from detecting light when a media is not present on the media path between the first light sensor and the light blocking mechanism, wherein the light blocking mechanism is conformal with the shape of a light detecting area of the media detector, and recessed in a cavity beneath the media path, such that when media is not present on the media path between the light detecting area and the light blocking mechanism the light blocking mechanism mates with the light detecting area to block light from being detected by the first light sensor.

14. The media detector of claim 13, wherein a protrusion extends from the conformal shape of the light blocking mechanism to enter a cavity of the media detector containing the first light sensor.

15. The media detector of claim 13, wherein a depression extends into the conformal shape of the light blocking mechanism to accept a portion of the first light sensor extending into the light detecting area of the media detector.

16. A media detection method for use with a media detector having a light source and a first light sensor to detect a light intensity of light reflecting off of a media that travels on a media path, with the light source and first light sensor being arranged on a top or bottom side of the media path, comprising:

impeding the propagation of light from the light source to block the first light sensor from detecting light by using a light blocking mechanism arranged on an opposing side of the media path, compared to the arrangement of the light source and first light sensor, when no media is present in the media path between the first light sensor and the light blocking mechanism; and determining whether the media is present based on an intensity of the first light sensor being effectively zero.

17. The media detection method of claim 16, further comprising determining a media type of the media.

18. The media detection method of claim 16, wherein the impeding of light from the light source further includes a blocking of the light source from radiating light onto an area of the media path.

19. A media detection method for use with a media detector having a light source and a first light sensor to detect a light intensity of light reflecting off of a media that travels on a media path, with the light source and first light sensor being arranged on a top or bottom side of the media path, comprising:

impeding the propagation of light from the light source to block the light source from radiating light by using a light blocking mechanism arranged on an opposing side of the media path, compared to the arrangement of the light source and the first light sensor, when no media is present in the media path between the light source and the light blocking mechanism; and determining whether the media is present based on an intensity of the first light sensor being effectively zero.

20. The media detection method of claim 19, further comprising determining a media type of the media.

21. A media detection method for use with a media detector having a light source and a first light sensor to detect a light intensity of light reflecting off of a media that travels on a media path, with the light source and first light sensor being arranged on a top or bottom side of the media path, comprising:

blocking the light source from radiating light onto an area of the media path area by using a light blocking mechanism arranged on an opposing side of the media path, compared to the arrangement of the light source and the first light sensor, when no media is present in the media path between the light source and the light blocking mechanism; and determining whether the media is present based on an intensity of the first light sensor being effectively zero, wherein the blocking of the light source by the light blocking mechanism also prevents light produced by other light sources to be detected by the first light sensor, such that the detected intensity of the first light source is effectively zero.

* * * * *